United States Patent [19]
Angelskar et al.

[11] Patent Number: 5,935,318
[45] Date of Patent: Aug. 10, 1999

[54] CONCRETE SPRAYING ADDITIVES

[75] Inventors: Terje Angelskar, Berg Dietikon; Helmut Gebhardt; Martin Weibel, both of Zurich, all of Switzerland

[73] Assignee: MBT Holding AG, Zurich, Switzerland

[21] Appl. No.: 08/871,053

[22] Filed: Jun. 9, 1997

[30] Foreign Application Priority Data

Jun. 14, 1996 [GB] United Kingdom .................. 9612464
Mar. 14, 1997 [EP] European Pat. Off. ............. 97104366

[51] Int. Cl.$^6$ ................................... C04B 24/12
[52] U.S. Cl. ...................... 106/727; 106/808; 106/819; 106/823
[58] Field of Search ................... 106/808, 696, 106/724, 727, 819, 823

[56] References Cited

U.S. PATENT DOCUMENTS

| | | | |
|---|---|---|---|
| 3,782,991 | 1/1974 | Burge | 106/819 |
| 4,406,703 | 9/1983 | Guthrie et al. | 106/93 |
| 5,032,181 | 7/1991 | Chung | 106/727 |
| 5,399,048 | 3/1995 | Walker | 405/129 |

FOREIGN PATENT DOCUMENTS

| | | |
|---|---|---|
| 0 657 398 A1 | 6/1995 | European Pat. Off. . |
| 52141837 | 11/1977 | Japan . |
| 57001505 | 11/1977 | Japan . |
| 82001505 | 1/1982 | Japan . |
| 403037145 | 2/1991 | Japan . |
| WO 96/05150 | 2/1996 | WIPO . |

*Primary Examiner*—Paul Marcantoni
*Attorney, Agent, or Firm*—Fish & Richardson P.C.

[57] ABSTRACT

An accelerating admixture for use with cementitious compositions, especially shotcrete, comprises aluminium sulphate and at least one alkanolamine. The admixture also preferably comprises an stabilising agent, which is preferably selected from aqueous stable polymeric dispersions and sepiolite magnesium silicate.

23 Claims, No Drawings

CONCRETE SPRAYING ADDITIVES

This invention relates to the spraying of cementitious compositions and to accelerators for use therein.

Shotcrete, concrete which is sprayed on to a substrate, must harden very quickly; typically it must have an initial set time of less than 3 minutes. Traditionally, this has been done by the use of powerful accelerators such as sodium aluminate, sodium and potassium hydroxide and certain chlorides. While conventional shotcrete accelerators such as these have delivered a satisfactory level of performance, they suffer from the problem of being caustic in nature. This makes working with shotcrete very unpleasant, leading as it does to the possibility of eye, skin and lung irritation, especially in enclosed spaces such as tunnels, and it necessitates the wearing of protective clothing which itself is unpleasant to wear in many conditions.

Attempts have been made to provide a non-caustic accelerator. One recent development has been the use of amorphous aluminium hydroxide and/or aluminium hydroxysulphate, and this has provided good results.

It has now been found that a combination of certain materials provides an accelerator which is not only non-caustic but which is also very effective. The invention therefore provides an accelerating admixture for cementitious compositions which admixture comprises aluminium sulphate and at least one alkanolamine.

The invention further provides a method of accelerating the cure of sprayed cementitious compositions, comprising the addition to a composition at a spray nozzle of an admixture as hereinabove described.

Although aluminium sulphate is known as a component of accelerator compositions, it has always been in association with aluminium hydroxide in which the aluminium sulphate was a minor component. In this case, the aluminium sulphate is being used as a major component and in the absence of added aluminium hydroxide. The aluminium sulphate for use in this invention may be selected for any such material known to the art. Preferred materials are hydrated aluminium sulphates of which many commercial grades are available.

In a further preferred embodiment, the aluminium sulphate may include a proportion of at least one additional water-soluble salt. Such addition can prolong setting time and improve final strength. The preferred salt is ferric sulphate, but other salts, such as ferric nitrate and aluminium nitrate may also be used. The proportion of salt may be up to 20% maximum (preferably 10% maximum) by weight of aluminium sulphate+salt.

The alkanolamines for use in this invention may be any such materials known to the art. Preferred alkanolamines include diethanolamine, triethanolamine and methyl diethanolamine. More than one such alkanolamine can be used.

Although it is possible to add the two components of the admixture separately to a spray nozzle (and the meaning of "admixture" for the purposes of this invention comprehends this), it is more convenient from the equipment, handling convenience and performance views to add them as a single admixture. The admixture may be prepared, for example, by dissolving aluminium sulphate in water to an appropriate extent (preferably a saturated solution is made) and then blending this with alkanolamine. The blending may be carried out using conventional equipment. The proportion of aluminium sulphate to alkanolamine in the accelerating admixture is from 1.7–170:1, preferably from 2.85–11.4:1, most preferably about 5.7:1, these ratios being based on anhydrous aluminium sulphate. In the usual case where a commercial material such as so-called "17%" aluminium sulphate (meaning 17% $Al_2O_3$, or about 57% $Al_2(SO_4)_3$) is used, the ratios are 3:1–300:1, preferably from 5:1–20:1, most preferably about 10:1 by weight.

In a preferred embodiment of the invention, the admixture additionally comprises a stabilising agent. This helps prolong shelf life and enhance performance, and it may be selected from any suitable stabilising agent known to the art. For example, the stabilising agent may be a surfactant selected from the wide variety of such materials known to the art. Two good groups of stabilising agents which work particularly well in this invention are aqueous, stable polymeric dispersions and sepiolite magnesium silicate.

By "stable" is meant that the dispersions do not settle appreciably on long standing. In this usage, the word "dispersions" is used to describe the physical state of the material (a two-phase system wherein a dispersed phase is heterogeneously distributed through a continuous phase). It does not attribute any mechanism of production thereto, and thus materials which are often referred to as emulsions (literally the dispersion of a liquid in another liquid, but often used to refer to the small particle size dispersions of polymeric materials prepared by a micellar emulsion polymerisation mechanism) are encompassed by the use of the term "dispersion". The word "latex" is often used to describe such systems.

The fact that aqueous polymeric dispersions work well in this invention is surprising as such materials are not generally thought of as stabilising agents. Any such aqueous polymeric dispersion may be used. An especially favoured type is an aqueous styrene-butadine latex. A typical examples is one sold under the trade mark "Synthomer" 9523 liquid (ex Synthomer Chemie GmbH, Frankfurt). Such a dispersion is used at a rate of 0.5 to 10%, preferably from 1 to 8%, solids by weight of the admixture.

Another preferred type of stabiliser is sepiolite magnesium silicate. Sepiolite is a type of clay mineral which is distinguished from other types (vermiculite, smectite, talc, kaolin, mica) in having a unique structure comprising essentially a series of talc-like ribbons (one sheet of magnesium octahedra between two sheets of silica tetrahedra, the silica tetrahedra inverting every six units). Sepiolite is characterised by high external irregular surface, an acicular morphology, a high internal porosity and a non-swelling structure.

It has been found that sepiolite works particularly well in this invention. It is preferably used in the proportion of from 0.1 to 10.0% by weight of the admixture.

A number of other ingredients may usefully be used. One of these is glycerol, which not only acts as a co-solvent for the aluminium sulphate but which also enhances stability and setting properties. It may be added preferably at a rate of up to 15% by weight of the admixture.

Other ingredients may also be added. One useful material is a corrosion inhibitor which inhibits damage of pumping equipment by the admixture which is acidic in nature. These may be chosen from a wide range of such materials, but it has been found that, for the purposes of this invention, cationic quaternary ammonium-based materials are preferred. Typical examples include quaternary ammonium salts which comprise fatty chains (preferably used together with a fatty acid chain-containing nonionic material. In these cases, the fatty chain is preferably derived from coconut, and a typical commercial product of this is "Dodigen" (trade mark) 95 (ex Hoechst). A further useful material is "Anticor" (trade mark) VV 328 (ex TensoChema AG), an ethoxylated benzalkonium chloride. Such materials may be used at a rate of from 0.1 to 2.0%, preferably from 0.2 to 1%, by weight of the admixture.

The ingredients of the admixture are added conventionally to a sprayable cementitious composition (for example, at the spray nozzle, in the form of an aqueous solution or dispersion). The dosage is typically 5–15% preferably 6–10%) solids by weight on cement.

The admixtures according to this invention give excellent results. One noteworthy feature is that acceleration of cure is up to normal standards, but with a reduced drop in final strength. Final strength is always impaired by the powerful accelerators used in shotcrete; the higher the dose, the bigger the drop. In this case, this effect is minimised. The invention therefore also provides a sprayed cementitious layer on a substrate whose hardening has been accelerated by an accelerating admixture as hereinabove described. The admixture according to the invention has the added advantage that it is alkali-free. A further and very surprising advantage is that the admixtures according to this invention perform well with a very broad range of cements, including some which are thought of as "difficult"; this is not the case with conventional shotcrete accelerators. Such cements include the very low gypsum content cements used in underground applications, cheaper cements which contain up to 5% lime and low clinker cements.

The invention will now be further described with reference to the following examples.

PREPARATION EXAMPLE 1

A blend of the following materials is made by adding the ingredients sequentially to a blender:

| | |
|---|---|
| aluminium sulphate (17% $Al_2O_3$) | 60.0 parts |
| diethanolamine | 6.5 parts |
| sepiolite magnesium silicate[1] | 1.5 parts |
| glycerol | 0.2 parts |
| water | 31.8 parts |

[1]"Pangel" S9 ex Tolsa

The resulting slurry is used as a "standard" formulation in a number of shotcrete examples which are hereinunder described.

PREPARATION EXAMPLE 2

A blend of the following materials is made by adding the ingredients sequentially to a blender:

| | |
|---|---|
| water | 20 parts |
| diethanolamine | 10 parts |
| aluminium sulphate | 63 parts |
| styrene-butadiene latex[2] | 7 parts |

[2]"Synthomer" 9523 liquid ex Synthomer Chemie

PREPARATION EXAMPLE 3

A blend of the following materials is made by adding the ingredients sequentially to a blender:

| | |
|---|---|
| water | 20 parts |
| diethanolamine | 10 parts |
| aluminium sulphate | 63 parts |
| corrosion inhibitor[3] | 2 parts |

[3]"Dodigen" 95, ex Hoechst

APPLICATION EXAMPLE 1

In this example, the cement used in the shotcrete was a "difficult" cement of the Cem IV type with a low clinker content.

A shotcreting composition is made up of the following materials;

| | |
|---|---|
| cement: | 400 parts |
| sand (0–5 mm) | 1600 parts |
| sand (0–15 mm) | 170 parts |

The mixture is mixed with water to give a water/cement (W/C) ratio of 0.4. The mixture additionally contains 2% by weight on cement of BNS (β-naphthalene sulphonate) superplasticiser. It is sprayed in various thicknesses using various quantities of the slurry described in Preparation Example 1 and the 28 day compressive strength is tested. The results are shown in Table 1.

TABLE 1

| | | | |
|---|---|---|---|
| quantity (% on cement) | 6 | 8 | 10 |
| thickness (cm) | 20 | 30 | 40 |
| compressive strength (28d) (N/mm$^2$) | 42.7 | 42.4 | 45.8 |

APPLICATION EXAMPLE 2

A shotcreting mix is prepared by mixing the following ingredients;

| | |
|---|---|
| cement (OPC*) | 425 parts |
| sand (0–8 mm) | 1713 parts |

*ordinary Portland cement

Water is added to give a W/C ratio of 0.45. To the mixture is additionally added 1.5% by weight on cement of BNS superplasticiser.

The mix is sprayed a number of times, each time using a different accelerating admixture and/or quantity of admixture and the sprayed concrete tested for final strength. The admixtures used are—

A: aluminium sulphate+triethanolamine in a weight ratio of 200:1

B: aluminium sulphate+diethanolamine in a weight ratio of 10:1

C: aluminium sulphate+diethanolamine in a weight ratio of 5:1

D: standard (as hereinabove described)

The results are shown in Table 2.

TABLE 2

| admixture | A | A | B | B | C | C | D | D |
|---|---|---|---|---|---|---|---|---|
| quantity[1] | 7 | 9 | 9 | 7 | 7 | 9 | 7 | 9 |
| compressive strength[2] (28d) (N/mm$^2$) | 44.8 | 33.9 | 34.9 | 44.1 | 31.7 | 34.2 | 44.1 | 43.1 |

[1]% by weight active ingredient on cement
[2]as measured on shotcrete cores.

APPLICATION EXAMPLE 3

A shotcrete mix is made up from the following materials:

| | |
|---|---|
| cement (OPC) | 425 parts |
| sand (0–8 mm) | 1713 parts |
| BNS superplasticiser | 1.5% on cement |

The W/C ratio used is 0.47. The mix is sprayed with two different accelerating admixtures, one the standard of previous application examples (referred to as D, as hereinabove) and the other a blend of aluminium sulphate, ferric sulphate and diethanolamine in the weight ratio of 9:1:1 (referred to as E). The final (28 day) compressive strengths are measured as previously described. The results are shown in Table 3.

TABLE 3

| admixture | D | D | B | B |
|---|---|---|---|---|
| quantity | 7 | 9 | 7 | 9 |
| compressive strength (28d) (N/mm$^2$) | 36.4 | 35.6 | 41.2 | 38.5 |

We claim:

1. An accelerating admixture for cementitious compositions which comprises hydrated aluminium sulphate and at least one alkanolamine in a respective weight ratio of 1.7–170:1 in the absence of added aluminum hydroxide.

2. An accelerating admixture according to claim 1, wherein the aluminium sulphate and the alkanolamine are blended to form a single additive for addition to a cementitious composition.

3. An accelerating admixture according to claim 1, wherein the admixture additionally comprises a stabilising agent.

4. An accelerating admixture according to claim 2, wherein the admixture additionally comprises a stabilising agent.

5. An accelerating admixture according to claim 4, wherein the stabilising agent is an aqueous, stable polymeric dispersion.

6. An accelerating admixture according to claim 5, wherein the stabilising agent is an aqueous styrene-butadiene lattice.

7. An accelerating admixture according to claim 3, wherein the stabilising agent is an aqueous, stable polymeric dispersion.

8. An accelerating admixture according to claim 7, wherein the stabilising agent is an aqueous styrene-butadiene lattice.

9. An accelerating admixture according to claim 3, wherein the stabilising agent is a sepiolite magnesium silicate.

10. An accelerating admixture according to claim 4, wherein the stabilising agent is a sepiolite magnesium silicate.

11. An accelerating admixture according to claim 1 which further comprises a corrosion inhibitor.

12. An accelerating admixture according to claim 11 which further comprises a corrosion inhibitor based on a cationic quaternary ammonium based material.

13. An accelerating admixture according to claim 12 wherein the cationic quaternary ammonium based material contains at least one fatty chain.

14. An accelerating admixture according to claim 1 which comprises:
   aluminium sulphate, diethanolamine, sepiolite magnesium silicate, and optionally, glycerol.

15. An accelerating admixture according to claim 1 which comprises:
   aluminum sulphate, diethanolamine, and a styrene-butadiene latex.

16. An accelerating admixture according to claim 1 which comprises:
   aluminum sulphate, diethanolamine, and optionally, a corrosion inhibitor.

17. A method of accelerating the cure of sprayed cementitious compositions, comprising the step of:
   adding the admixture according to claim 1 to the cementitious composition at a spray nozzle of an apparatus adapted for spraying cementitious compositions.

18. A sprayed cementitious layer on a substrate whose hardening has been accelerated by an accelerating admixture according to claim 1.

19. An accelerating admixture for cementitious compositions which consists essentially of:
   aluminium sulphate and at least one alkanolamine in the absence of added aluminum hydroxide;
   optionally, a stabilising agent selected from an aqueous, stable polymeric dispersion, an aqueous styrene-butadiene lattice, and sepiolite magnesium silicate.

20. An accelerating admixture according to claim 19 which further comprises:
   a corrosion inhibitor.

21. An accelerating admixture for cementitious compositions according to claim 19 which consists essentially of:
   aluminium sulphate and at least one alkanolamine in the absence of added aluminum hydroxide;
   and an aqueous, stable polymeric dispersion as a stabilising agent.

22. An accelerating admixture for cementitious compositions according to claim 19 which consists essentially of:
   aluminium sulphate and at least one alkanolamine in the absence of added aluminum hydroxide;
   and an aqueous, stable an aqueous styrene-butadiene lattice as a stabilising agent.

23. An accelerating admixture for cementitious compositions according to claim 19 which consists essentially of:
   aluminium sulphate and at least one alkanolamine in the absence of added aluminum hydroxide;
   and sepiolite magnesium silicate as a stabilising agent.

* * * * *